United States Patent [19]
Greenbaum

[11] 3,872,621
[45] Mar. 25, 1975

[54] HORTICULTURAL CELL SYSTEM

[76] Inventor: George Greenbaum, 790 Boylston St., Boston, Mass. 02199

[22] Filed: Aug. 2, 1973

[21] Appl. No.: 384,921

[52] U.S. Cl.................. 47/1.2, 47/34.11, 47/56, 206/423, 53/28
[51] Int. Cl........................................... A01g 31/00
[58] Field of Search ............... 47/1.2, 56, 34.13, 37, 47/9, 37.3, 38.1, 38, 34.11, 34.12; 53/3, 28, 31, 38, 39, 177, 178, 180; 206/423, 491, 494

[56] References Cited
UNITED STATES PATENTS

| | | | |
|---|---|---|---|
| 2,328,017 | 8/1943 | Irmscher | 53/38 X |
| 2,536,773 | 1/1951 | Saidel | 53/38 X |
| 2,987,857 | 6/1961 | Whelan | 53/28 X |
| 3,172,234 | 3/1965 | Eavis | 47/1.2 |
| 3,241,264 | 3/1966 | Porter et al. | 47/1.2 X |
| 3,361,359 | 1/1968 | Chapin | 47/38.1 X |
| 3,362,106 | 1/1968 | Goldring | 47/38 X |
| 3,375,607 | 4/1968 | Melvold | 47/34.13 X |
| 3,467,142 | 9/1969 | Boyle et al. | 47/56 X |
| 3,478,870 | 11/1969 | Segal | 53/28 X |
| 3,546,055 | 12/1970 | Spertus | 47/56 |

FOREIGN PATENTS OR APPLICATIONS

| | | | |
|---|---|---|---|
| 922,106 | 3/1973 | Canada | 47/38.1 X |
| 45-32892 | 10/1970 | Japan | 47/56 |

*Primary Examiner*—Edgar S. Burr
*Assistant Examiner*—E. H. Eickholt

[57] ABSTRACT

A horticultural cell system which comprises a belt of sheet material folded in half longitudinally along a fold line and having its two layers sealed along lines transverse to and spaced apart along the belt. The lines of seals extend from the free edges of the layers only partially across the width of the belt toward the fold line. The seals form and separate a series of cells, each suitable for receiving the root system of a mature plant, and an alternating series of web portions which space the cells a desired distance apart. The portions of the layers adjacent to the fold line form a continuous tube which is common to and communicates with each of the cells, and has a greater width than that of the cells. The root system of each of the plants can extend into the tube, which provides a common plant support system and allows the root systems to expand to a greater degree than if confined solely to the individual cells.

11 Claims, 10 Drawing Figures

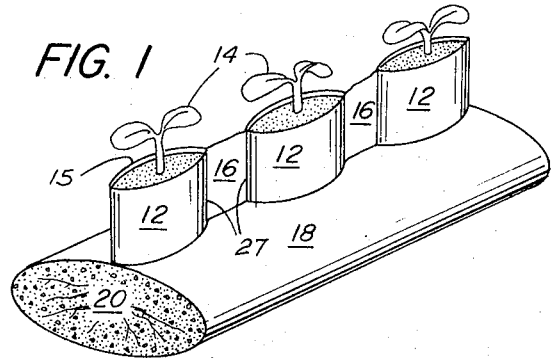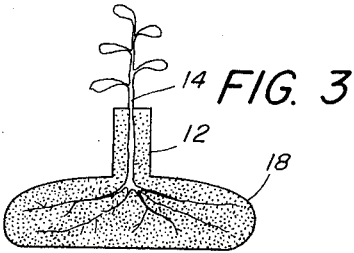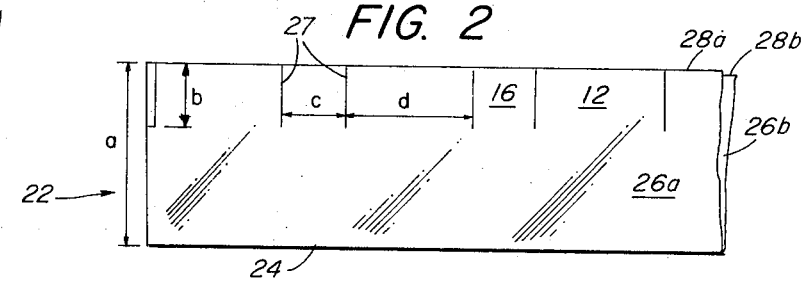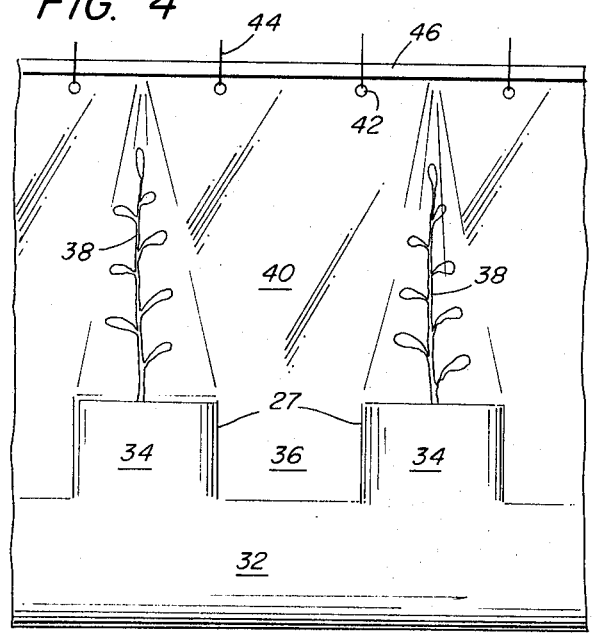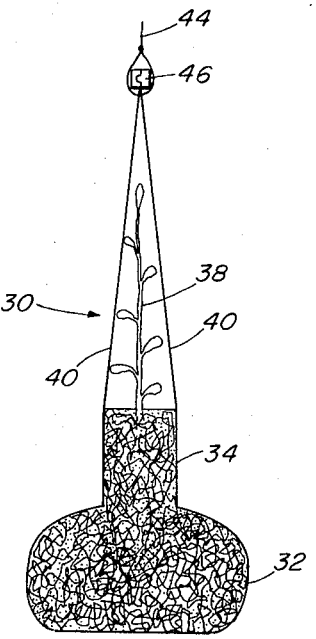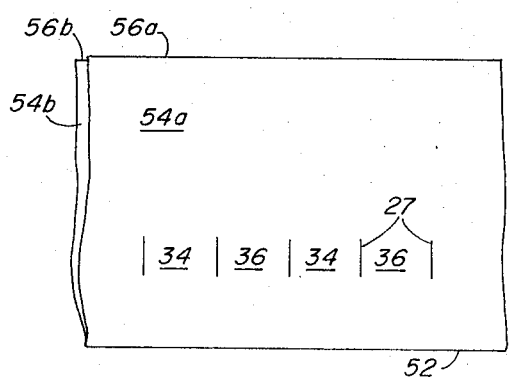

HORTICULTURAL CELL SYSTEM

BACKGROUND AND SUMMARY OF THE INVENTION

My U.S. Pat. No. 3,739,522 for a "Horticultural Cell System and Method of Manufacture" discloses and claims a cell system formed by folding a belt of sheet material, such as plastic, in half longitudinally to form two layers. The layers are sealed along lines transverse to and spaced apart along the belt, and extending from the fold line partially toward the free edges of the belt. This forms a series of cells, each suitable for receiving the root portion of a plant. Each cell has its own individual quantity of soil, to which plant nutrients and water are added. The expansion of the root systems is limited by the dimensions of the individual cells. The free edge portions of the layers are unsealed, and provide a means for covering the open upper surfaces of the cells.

According to the present invention, a belt of sheet material is folded in half longitudinally along a fold line, forming two layers. The layers are sealed on lines extending only partially across the width of the belt, from the free edges of the layers toward the fold line, but terminating short of the fold line. The seals form a series of cells which have an approximately oval cross-section, with an open mouth formed between the free edges of the layers. Portions of the layers which lie adjacent to the fold line are unsealed, and form a continuous tube portion which functions as a manifold; i.e., the tube communicates with each of the cells in common.

The tube portion in the preferred embodiment, when filled with soil, has the general cross-sectional form of an ellipse, and provides a common soil system for the plants received in each of the cells. The cells are dimensioned to insure proper spacing between mature plants. The tube portion, being of a greater width than the individual cells, allows greater room for lateral root growth, and provides a larger volume for the soil system, than is afforded by the system disclosed in my aforementioned U.S. Pat. No. 3,739,522. In addition to the advantage of enhancement of plant growth, the conduit provides structural stability to the entire cell system, whereby it may stand alone on any substantially level surface. It also provides more direct fluid communication between cells for the distribution of moisture.

According to one embodiment of the invention, seal lines are formed between the free edges of the layers and the fold line, but terminate short of either. The portions of the layers adjacent to the free edges form closure elements to enclose the plant and provide a controlled atmosphere, while the portions adjacent to the fold line form a continuous tube as in other embodiments of the invention.

According to another embodiment of the invention, two sets of cells and tubes are formed on opposite sides of a longitudinal belt comprising four folded layers of sheet material. Two separate series of cells are thus provided in one unit.

BRIEF DESCRIPTION OF THE DRAWINGS

FIG. 1 is a pictorial view, partially in section, of a cell system embodying the invention;

FIG. 2 is a view in front elevation of the system of FIG. 1, prior to filling;

FIG. 3 is a sectional end view of the system of FIG. 1;

FIG. 4 is a fragmentary view in front elevation of a cell system according to another embodiment of the invention, which has a tent structure to provide a controlled atmosphere;

FIG. 5 is a sectional end view of the system of FIG. 4;

FIG. 6 is a fragmentary view in front elevation of the belt of FIG. 4, prior to filling;

DESCRIPTION OF THE PREFERRED EMBODIMENT

Figure 7:
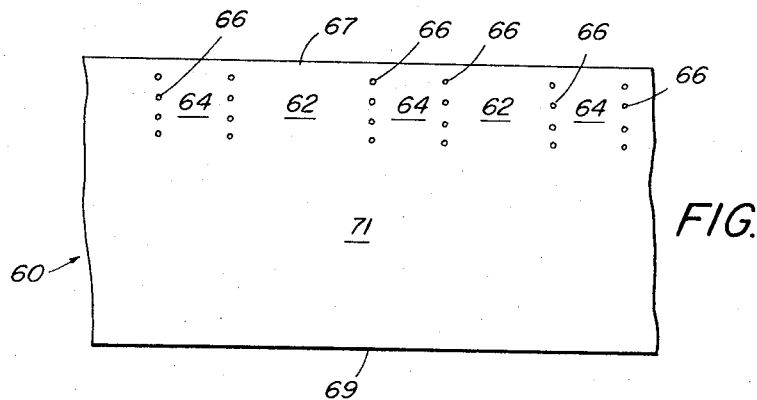
FIG. 7 is a fragmentary view in front elevation of a modified system which employs spot seals to form the cell portions in the belt.

In FIG. 1, a cell system or belt 10 incorporating a first embodiment of the invention comprises a series of cells 12 in which individual plants 14 are received. The cells 12 are spaced apart by web portions 16. The cells have an approximately oval cross-section, and each has an open mouth 15 in its upper portion. The cells extend from and communicate in common with a continuous tube portion 18 of the belt, which assumes the approximate cross-sectional form of an ellipse when filled with plant support material 20, such as soil containing plant nutrients. The material 20 is shared in common by the root systems of each of the plants 14. FIG. 3 illustrates the extensive amount of lateral root growth allowed by the tube portion 18. The cells 12 are much narrower, but have ample width to accommodate the roots of young plants before their roots reach the tube portion, and to receive the stems of mature plants.

The cell system 10, before filling, appears as shown in FIG. 2. The height of the cells 12 corresponds to the dimension $b$; their width to the dimension $d$. The height of the web portions 16 corresponds to the dimension $b$, and their width to the dimension $c$. The cell system is formed by folding a sheet of material 22, preferably of plastic such polyethylene, longitudinally in half along a fold line 24 to form two layers 26a and 26b. These layers are heat-sealed along seal lines 27 at spaced intervals, transversely from the free edges 28a and 28b of the layers toward the fold line to form the web portions 16. The unsealed portions of the layers adjacent to the fold line form the continuous tube portion 18. The layers 26a and 26b are joined only where they are sealed on the lines 27. To seal the ends of the belt of sheet material, a continuous transverse seal (not shown) is formed, extending from the free edges 28a and 28b of the layers 26a and 26b to the fold line 24.

In the foregoing embodiment, the free edges of the layers are sealed. If desired, however, the free edges may be left unsealed to provide closure-forming flaps which may be folded over the soil at the mouth of the cell and pinned in place to prevent moisture evaporation; in that case, the seal lines 27 are located in a central portion of the belt, and do not extend either to the fold line 24 or to the free edges 28a and 28b.

In the illustrated construction, the cells 12 are separated by the web portions 16 at the distance $c$. However, the cells may adjoin one another directly at common seal lines 27, omitting the web portions 16. This is a matter of choice, as may be appropriate to the size and optimum spacing of various types of plants.

A modified cell system 30, shown in FIGS. 4-6, includes a tube portion 32 at its base, and a plurality of cells 34 separated by web portions 36, in which the layers 54a and 54b remain contiguous after the cells are filled with soil, like the web portions 16 in the preceding embodiment. Plants 38 are received in the cells 34, with their roots extending into the tube portion 32. Tent-like closure portions 40 extend upwardly from the web portions 36 and cells 34. Vent holes 42 are located in the upper portions of the closure portions 40 to permit ventilation; but these may be omitted if some other means of natural or artificial atmosphere control is provided. Lines 44 are secured to the top of the elements 40, whereby the system may be suspended from lines or poles (not shown). The top portions or free edges of the closure elements 40 are closed, for example, by a male and female plastic closure strap 46 of a well-known kind, or by clips or the like. The ends of the closure elements 40 can also be sealed together if desired. A controlled artificial atmosphere may be maintained within the cell structure by suitable means of a conventional nature (not shown) to promote photosynthesis. Any desirable gas mixture may be introduced, such as a combination of carbon dioxide and air. The material used for the construction of the closure elements 40 may be clear or of various colors, such as a purple or wine color to permit preferred frequencies of light to promote plant growth.

FIG. 6 illustrates the system 30 prior to filling. In forming the system a belt of sheet material 50 is folded in half longitudinally along a fold line 52 to provide the two layers 54a and 54b. The seals 27 which form the web portions 36 are disposed intermediate free edges 56a and 56b of the layers and the fold line 52. The portions of the layers 54a and 54b lying between the free edges 56a and 56b and the seals 27 form the closure portions 40. The portions of the layers lying between the seals 27 and the fold line 52 form the continuous tubular portion 32.

The preceding embodiments have included continuous seals 27. In FIG. 7, a belt 60 includes cells 62 and web portions 64 separated by lines of localized spot seals 66 forming the belt layers. The spot seals 66 may be circular or of other forms, and have greater strength than the linear seals 27 previously described. They form a quilted pattern, which permits liquid flow through the webs 64 between the cells 62, but holds the layers of the sheet more securely against the outward pressure of the soil and the hydrostatic pressure of water contained in the cell system. Any number of spot seals may be used in any pattern as desired. The lines of the seals extend, as before, from the free edges 67 of the belt 60 only partially across its width, leaving a continuous tube portion 71 between the seals and the fold line 69.

Figure 8:
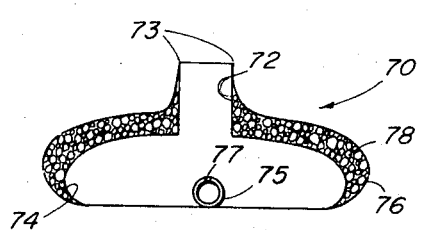
FIG. 8 is a sectional end view of an insulated double-walled cell system.

FIG. 8 shows a double-walled cell system 70 that is particularly useful in hot climates, since it tends to insulate the roots of the plants. The cells 72 and a continuous tube portion 74 are formed as described in the preceding embodiments. An outer wall 76 is formed of a separate folded sheet, and is secured to the cells 72 and the tube portion 74 by seals 73 extending lengthwise of the system. The outer wall 76 is formed of a sheet wider than that which forms the elements 72 and 74, leaving a space between. This space is filled with particulate granular material 78, such as pea-size gravel, sand, polystyrene foam, crumbs, vermiculite, or the like. Any or all of the cells 72, tube portion 74, and outer wall 76 may be perforated to allow for the flow of air and moisture therethrough.

Another optional feature shown in FIG. 8 is the provision of a flexible conductor pipe 75 which extends the full length of the cell system, and has a series of longitudinally spaced holes 77 communicating with the interior of the tube portion 74. The pipe 75 can be used to supply steam, water, air, ammonia, or other beneficial liquids or gases into the soil and root systems contained in the tube portion 74. Such a pipe can also obviously be employed with any of the described embodiments.

Figure 10:
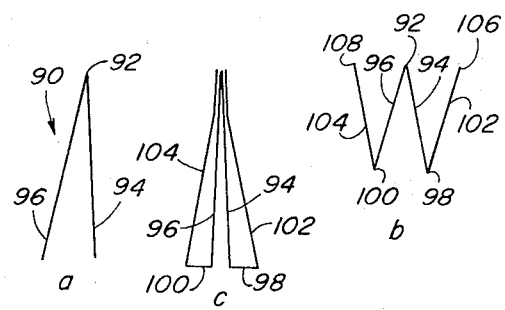
FIGS. 10(a), (b) and (c) are end views of the system of FIG. 9, illustrating the form of the two sets of cells and tubes.
Figure 9:
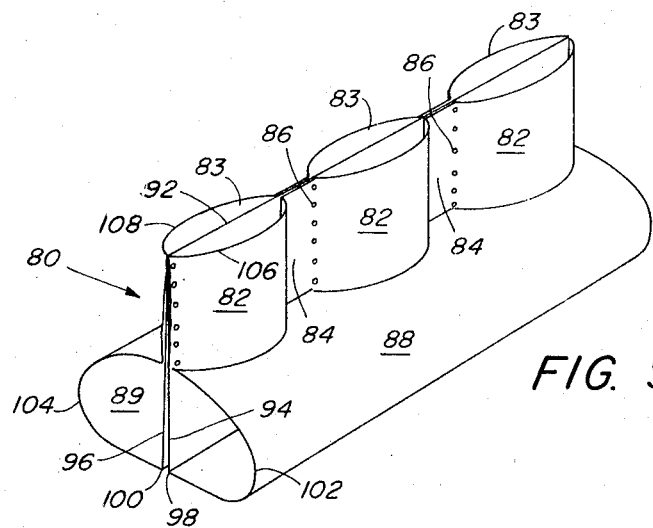
FIG. 9 is a pictorial view of another embodiment in which two sets of cells and tubes are formed in a common belt.

In FIG. 9, a double-cell system 80 is formed in a single belt, and comprises a first series of cells 82 having the general cross-section of a chordal segment of a circle, an opposite second series of cells 83 of the same form, and alternating web portions 84, which are formed by lines of spot seals 86. Linear seals like those of FIGS. 1-6 may be used alternatively. A tube portion 88 is common to and communicates with the cells 82, and a tube portion 89 is common to and communicates with the cells 83. To form the double-cell system 80, a belt of sheet material 90 is folded in half longitudinally at a first fold line 92, forming two inner layers 94 and 96 in a V-shaped configuration, as shown in FIG. 10a. The two layers 94 and 96 are then each folded in half longitudinally along second fold lines 98 and 100, forming two outer layers 102 and 104 in a W-shaped configuration as shown in FIG. 10b. The belt now comprises two outer layers 102 and 104 having free edges 106 and 108, and two inner layers 94 and 96 terminating at one edge in the first fold line 92 and at the other edge in the second fold lines 98 and 100. The first fold line 92 is substantially parallel to the free edges 106 and 108 of the outer layers 102 and 104. All four layers are then sealed together in the seal lines 86 extending partially across the width of the belt from the free edges 106 and 108 and the first fold line 92 toward the second fold lines 98 and 100, as shown in FIG. 10c.

What I claim is:
1. A horticultural cell system, comprising:
a belt of sheet material folded along a fold line longitudinally into two layers, with the free edges of the sheet material substantially parallel, said layers being sealed to one another along lines of seals extending only partially across the width of said belt toward said fold line, said lines of seals being spaced apart longitudinally of said belt to form a series of cells;
said cells having an approximately oval cross-section when filled with soil and each having an open mouth formed between the edges of said layers;
portions of said layers adjacent to said fold line forming a continuous tube portion common to and in communication with each of said cells, whereby the root systems of plants disposed in said cells may extend into said tube portion
said tube portion having a greater cross-sectional area than said cells, and forming a supporting base to hold the system upright, said seals serving to maintain the cross-sectional form of the system against lateral pressure of soil contained therein.

2. The cell system of claim 1, said lines of seals defining a series of contiguous web portions in said layers, alternating longitudinally of said belt with said series of cells.

3. The cell system of claim 1, wherein each of said lines of seals is disposed intermediate said fold line and said free edges of said layers; and portions of said layers adjacent to said free edges, lying beyond said lines of seals and forming parts of said cells, provide closure elements for said cells.

4. The cell system of claim 3, wherein the edges of said layers are sealed together to provide an enclosed tent-like structure.

5. The cell system of claim 3, wherein said portions of said layers adjacent to said free edges are formed with a plurality of vent holes.

6. The cell system of claim 1, wherein each of said lines of seals is formed by a continuous linear seal between said layers.

7. The cell system of claim 1, wherein each of said lines of seals is formed by a series of spaced-apart localized spot seals.

8. The cell system of claim 1, wherein said lines of seals extend to said free edges of said sheet.

9. A horticultural cell system comprising a belt of sheet material folded along a first fold line longitudinally into two layers, with the free edges of the sheet material substantially parallel;

each of said two layers being folded in half longitudinally along second fold lines to form two inner and two outer layers, the free edges of said outer layers being substantially parallel to said first fold line, said inner and outer layers being sealed to one another along lines of seals extending only partially across the width of said belt toward second fold lines;

said lines of seals being spaced apart longitudinally of said belt to form a first series of cells on one side of said belt and a second series of cells on a second side of said belt, portions of said inner and outer layers which lie beyond said lines of seals on either side of said belt and adjacent to said second fold lines forming two parallel continuous tube portions including a first tube portion common to and in communication with each of the cells of said first series and a second tube portion common to and in communication with each of the cells of said second series.

10. The cell system of claim 9, said lines of seals defining a series of contiguous web portions in said layers, alternating longitudinally of said belt with said series of cells.

11. The cell system of claim 9, said lines of seals extending to said free edges of said sheet.

* * * * *